United States Patent [19]
Holloway, Jr.

[11] Patent Number: 5,993,111
[45] Date of Patent: Nov. 30, 1999

[54] METHOD AND SYSTEM FOR FLOOD IRRIGATION

[76] Inventor: Rufus Madison Holloway, Jr., 1616 Lake Shore Dr., Orlando, Fla. 32806

[21] Appl. No.: 08/906,757

[22] Filed: Aug. 5, 1997

[51] Int. Cl.$^6$ .............................. A01G 9/02; A01G 25/00; E02B 8/06; E02B 13/00
[52] U.S. Cl. .............................. 405/39; 405/52; 405/108; 47/66.1; 47/79; 47/1.01 T
[58] Field of Search ................................ 47/65.5, 66.1, 47/79, 1.01 R, 1.01 F, 1.01 T; 405/36, 38, 39, 50, 52, 107, 108, 303

[56] References Cited

U.S. PATENT DOCUMENTS

| | | | |
|---|---|---|---|
| 700,076 | 5/1902 | Patten | 405/107 |
| 813,069 | 2/1906 | Wright | 405/107 |
| 1,262,898 | 4/1918 | Wright | 405/36 |
| 3,797,253 | 3/1974 | Rodieck | 405/37 |
| 3,849,991 | 11/1974 | Niederwemmer | 405/38 |
| 4,117,685 | 10/1978 | Skaife | 405/36 |
| 4,268,993 | 5/1981 | Cunningham | 47/1.01 R |
| 4,431,338 | 2/1984 | Hornabrook | 405/37 |
| 4,538,377 | 9/1985 | Thornton | 47/1.01 R |
| 4,576,511 | 3/1986 | Vidal, Jr. | 405/37 |
| 5,009,029 | 4/1991 | Wittlin | 47/62 A |
| 5,160,214 | 11/1992 | Sakurai et al. | 405/36 |
| 5,252,108 | 10/1993 | Banks | 47/58 |
| 5,355,618 | 10/1994 | Pedersen | 47/18 |
| 5,403,118 | 4/1995 | Davis et al. | 405/36 |
| 5,409,510 | 4/1995 | Houweling | 47/62 A |
| 5,440,836 | 8/1995 | Lee | 47/1.01 R X |
| 5,842,310 | 12/1998 | Liu et al. | 47/65.5 X |

OTHER PUBLICATIONS

Wesley M. Jarrell, Subirrigated Pots Mean Healthy Roots and Healthy Returns, Sep. 1991; pp. 60–71, Grower Talks.
Stephen Swanson, From The Bottom Up, Farwest Magazine, pp. 51–52, Aug., 1996, vol. 40.

*Primary Examiner*—David J. Bagnell
*Assistant Examiner*—Tara L. Mayo
*Attorney, Agent, or Firm*—Robert L. Wolter, Esq.; Holland & Knight LLP

[57] ABSTRACT

The system includes a plurality of flood plains. Each flood plain contains a plurality of plants and each plant is held in a pot. The flood plains are excavated at different elevations from an upper most elevation to a lower most elevation. The flood plains are sequentially flooded for a resident time period with a selected volume of water directed from a water source. As the flood plains are excavated to different elevations, gravity, and a series of flood gates, control the water flow from one flood plain to a next lower flood plain. Each flood plain has a top surface and an underlying bed comprising a soil and clay composition. The surface of each bed is contoured to adequately drain water from one flood plain to the next. This clay mixture firms the bed to adequately support vehicles and laborers to prevent depressions in the bed which may adversely affect water flow in and out of a flood plain. Each of the flood plains is lined with a water impermeable membrane. The flood plains are also contoured to effectively drain water from one flood plain to the next. A water reclamation system is connected to the irrigation system. Water drained from the flood plains it is collected in a retention pond and pumped to a holding pond. The water in the holding pond or reservoir is used to flood the irrigation field.

23 Claims, 4 Drawing Sheets

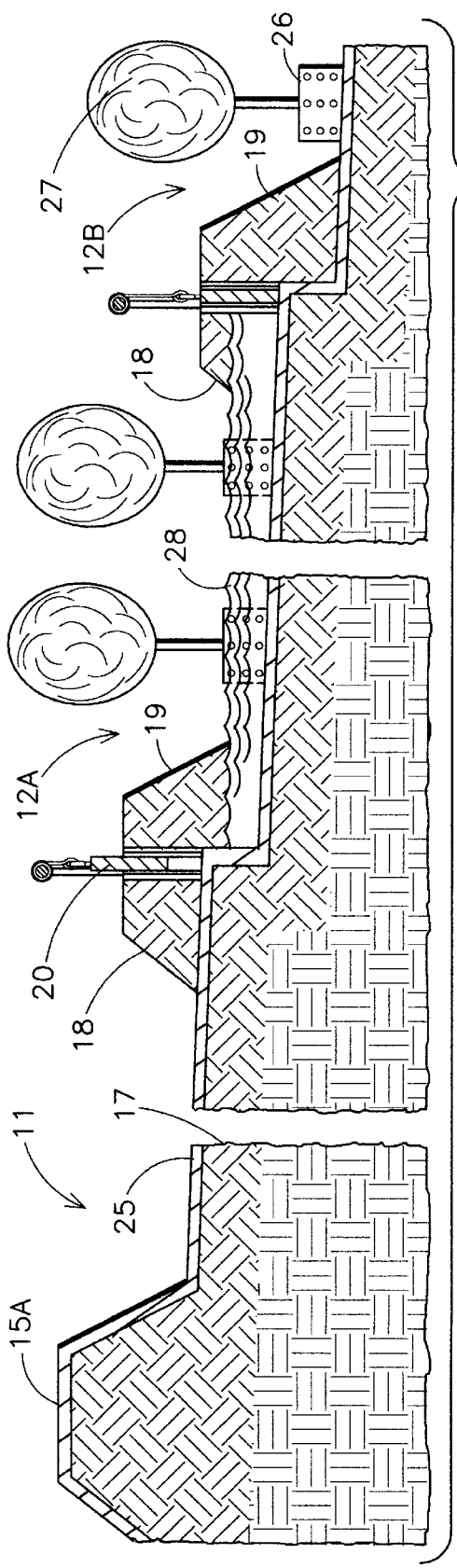
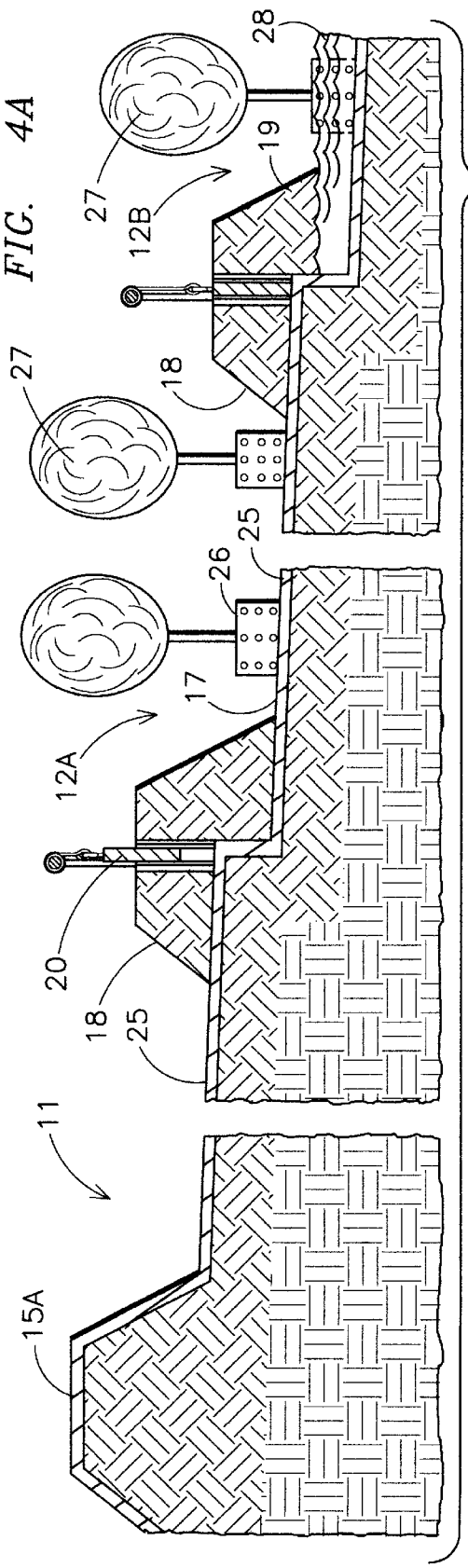

METHOD AND SYSTEM FOR FLOOD IRRIGATION

This invention relates to irrigation methods and techniques. More specifically, this invention pertains to techniques and systems employing flood irrigation.

BACKGROUND OF THE INVENTION

Various irrigation methods and systems are incorporated for use in various industries as nurseries or farming. Plants as ornamental trees as crepe myrtles, oak trees, magnolia trees, crop seedlings or other plants are often grown in controlled situations. These types of plants are usually sold at an early stage in their life cycles, so nurseries maintain seedlings or saplings which are smaller than mature plants. As a result, these nurseries are able to maintain large volumes of plants in a limited amount of space. In as much as these plants are being handled at early stages of their life cycles, proper care is critical and necessary to maintain the plants.

Various methods of irrigation may be used to supply water to the plants. One such irrigation technique utilizes overhead sprinklers. An overhead sprinkler system may fail to uniformly distribute water to all plants. While overhead sprinkler systems may be less expensive to operate, these systems are very expensive to install.

Another irrigation method often used is a water bubbling system that employs drip hoses and pipes. Elongated pipes are placed adjacent a row of plants and water bubbles through an aperture in the hose adjacent a plant. This may provide a more uniform distribution of water than overhead sprinkler systems; however, these systems arc labor intensive and expensive to maintain. Each source of water must be monitored to insure water is distributed from the apertures to the plants.

SUMMARY OF THE INVENTION

It is an object of this invention to provide a system and method for irrigation that efficiently distributes water to a plurality of plants, and is cost effective. Another objective of this invention is to provide a flood irrigation system and method that utilize a water reclamation system.

These and other objectives are achieved by employing the present novel flood irrigation method and system. The system includes a plurality of flood plains. Each flood plain contains a plurality of plants and each plant is held in a pot. The flood plains arc excavated at different elevations from an upper most elevation to a lower most elevation. The flood plains are sequentially flooded for a resident time period with a selected volume of water directed from a water source. As the flood plains are excavated to different elevations, gravity, and a series of flood gates, control the water flow from one flood plain to a next lower flood plain.

Each flood plain has a top surface and an underlying bed comprising a soil and clay composition. The surface of each bed is contoured to adequately drain water from one flood plain to the next. This clay mixture firms the bed to adequately support vehicles and laborers to prevent depressions in the bed which may adversely affect water flow in and out of a flood plain. Each of the flood plains is lined with a water impermeable membrane. The flood plains are also contoured to effectively drain water from one flood plain to the next.

A water reclamation system is connected to the irrigation system. Water drained from the flood plains it is collected in a retention pond and pumped to a holding pond. The water in the holding pond or reservoir is used to flood the irrigation field.

BRIEF DESCRIPTION OF THE DRAWINGS

FIG. 4 through 4B is a sectional of the irrigation system taken along line 4—4 showing the sequential flooding of consecutive flood plains.

DETAILED DESCRIPTION OF THE DRAWINGS

Figure 1:
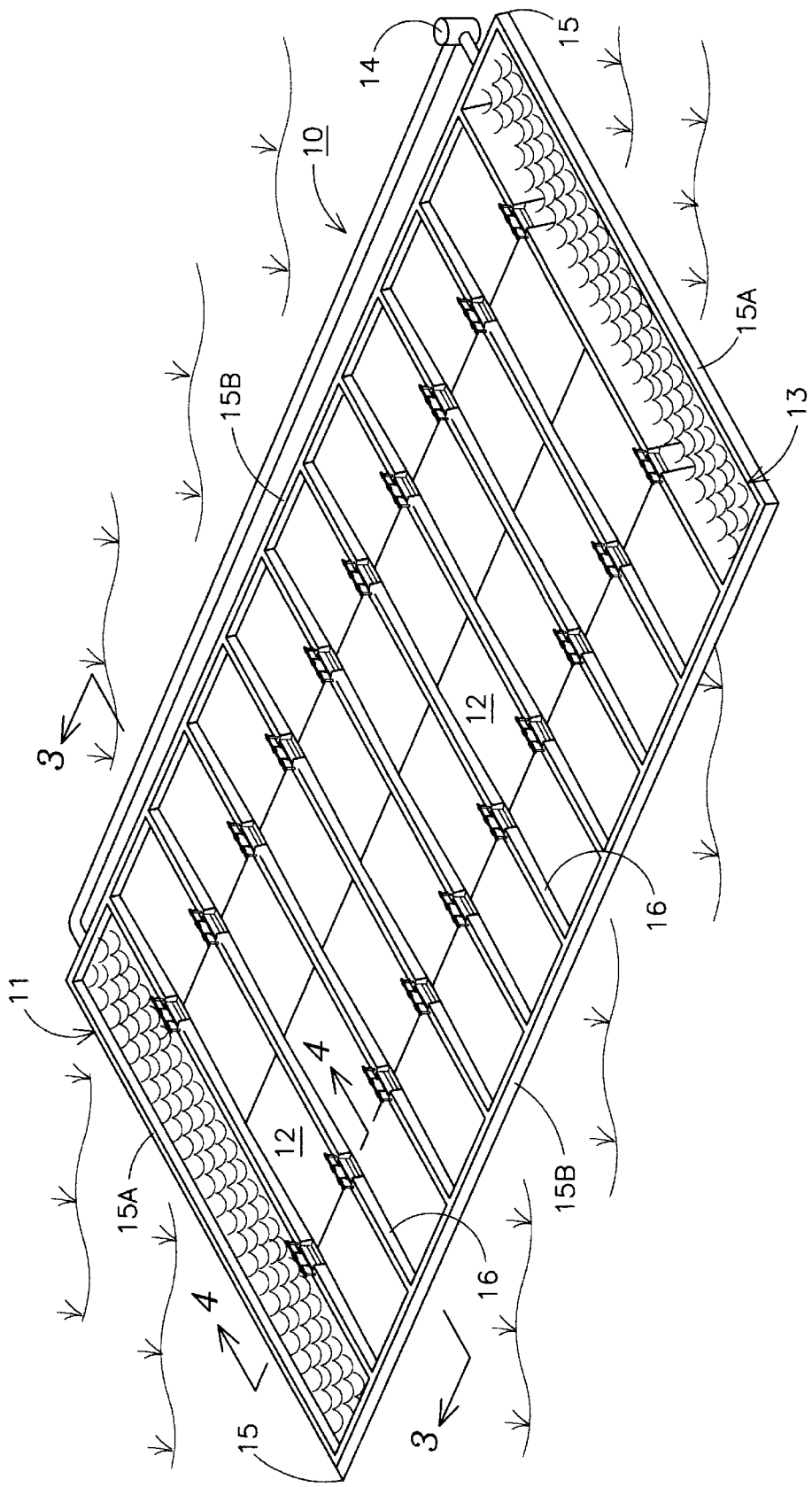
FIG. 1 is a perspective view of the present flood irrigation system.

A flood irrigation system 10 is depicted in FIG. 1 which incorporates the method for flood irrigation that is the subject invention. The irrigation system 10 in the embodiment shown in FIG. 1 is excavated to generally form an overall gradient, and includes a reservoir pond 11 for a water source, a plurality of flood plains 12 for holding potted plants and water, a retention pond 13 for collecting water drained from the flood plains 12 and a pump system 14 for reclaiming water from the retention pond 13 to the reservoir pond 11. The reservoir pond 1, flood plains 12 and retention pond 13 are excavated at different elevations so that water flow from the reservoir 11, through the flood plains 12 and to the retention pond 13 is controlled largely by gravity.

The embodiment of the invention illustrated in FIG. 1 has a dike system that includes a plurality of dikes that serve to hold water within the flood plains and separate consecutive or adjacent flood plains 12. The flood plains 12, as well as the reservoir pond 11 and retention pond 13 in this embodiment, are surrounded by a perimeter dike 15. Interior dikes 16 extend from side to side of the perimeter dike 15 dividing an excavated area into the reservoir pond 11, flood plains 12 and retention pond 13. The flood irrigation system shown in FIG. 1 is constructed in a rectangular figure. The perimeter dike 15 has two end dikes 15A and two side dikes 15B. The flood plains 12 extend from one side dike 15B to the next parallel one another. Accordingly, the flood plains 12 are excavated in a stepped design along the gradient between an upper most elevation occupied by the reservoir 11, and a lower most elevation occupied by the retention pond 13.

Figure 4:
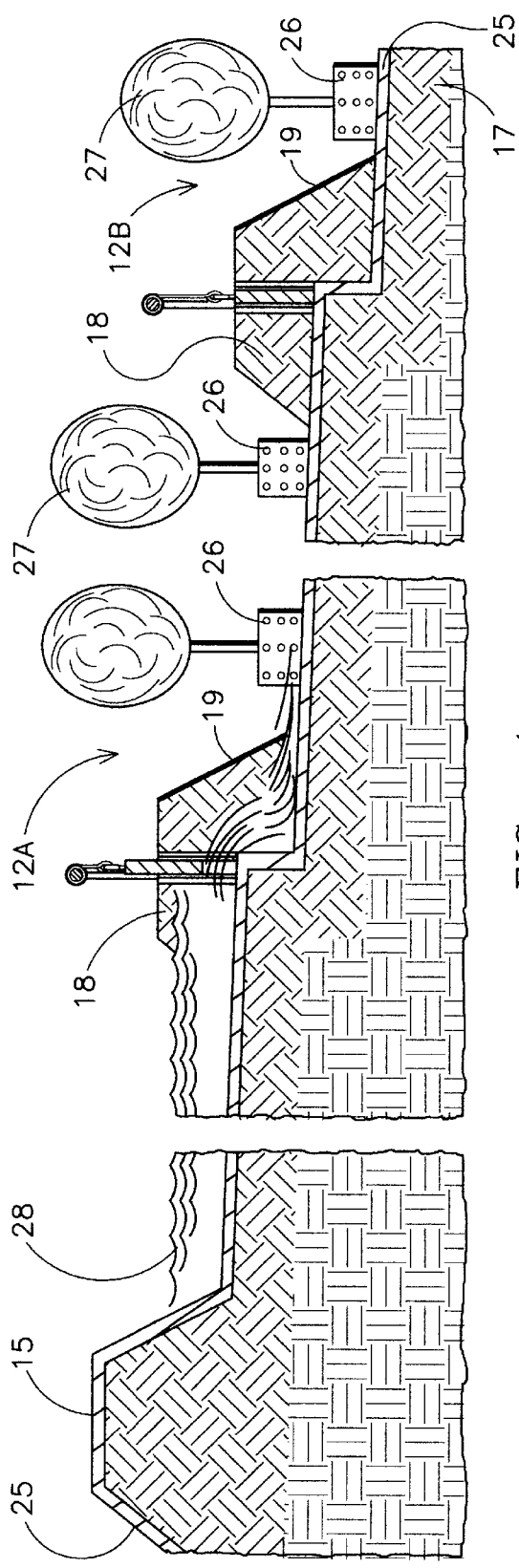

As illustrated in FIGS. 4, 4A and 4B, consecutive flood plains 12A and 12B share interior dike 16. Each interior dike 16 may be separated into two dikes which are identified as an egress dike 18 for the upper flood plain 12A and an ingress dike 19 for the lower flood plain 12B. The flood plain 12 includes top surface having an underlying bed 17 which are bordered at sides by an ingress dike 19, an egress dike 18 and the dikes 15B and 15B (shown in FIG. 1).

As shown in FIG. 4, the top and surface and bed 17 of each of the flood plains 12A and 12B are sloping or inclined downward from the egress dike 18 to the ingress dike 19. The pitch or angles of the surface of the bed 17 of the flood plains 12 may vary depending on numerous factors such as the overall size of the irrigation system, the soil texture, the size of each flood plain 12 and the overall gradient of the irrigation system from the top to bottom. A spillway 29 (also shown in FIGS. 2, 2A and 2B) connects the upper flood plain 12A to the lower flood plain 12B. A flood gate 20 is mounted in the spillway 29 and is adjustable to open and close the spillway 29 for water to flow from the upper flood plain 12A to the lower flood plain 12B.

With respect to FIGS. 4, 4A and 4B, the steppe design is illustrated between two consecutive flood plains 12A and 12B, and the reservoir pond 11. The difference in the elevation in the flood plains 12A and 12B will vary depending on the size of the irrigation system 10 constructed. In a large scale system that includes flood plains 12 over twenty acres, the flood plains 12 may be as long as six hundred feet long and ninety feet wide. The difference in elevation between consecutive flood plains in such a case may be approximately two to three feet. The elevation of the flood plain 12 and bed 17 may drop about six inches from the ingress dike 19 to the egress dike 18.

In addition to the surface of the flood plain 12 sloping downward from an egress dike 18 to an ingress dike 19, the surface of the flood plain 12 also has transversely inclined surfaces 22. The flood plain 12 has a median 21, centered between the side dikes 15B. The median 21 is about the same elevation of the flood plain 12 at the points where the flood plain 12 meets the side dikes 15B. The surfaces 22 are inclined downward from the median 21 to approximately a centerline of the flood gate 20. The surfaces 23 extend downward from the dikes 15B toward the surfaces 22 forming a funnel-like surface on the bed 17 for controlling the flow of the water in and out of the flood plain 12.

A water impermeable membrane 25 covers the entire surface of the flood plain 12 and the dikes 15 and 16. The membrane 25 seals the flood plains 12 and prevents erosion of the underlying soil. The soil is preferably treated with a clay mixture to form a firm soil top layer 24. This top layer 24 prevents depressions forming in the bed 17 which may restrict water flow.

Figure 2:
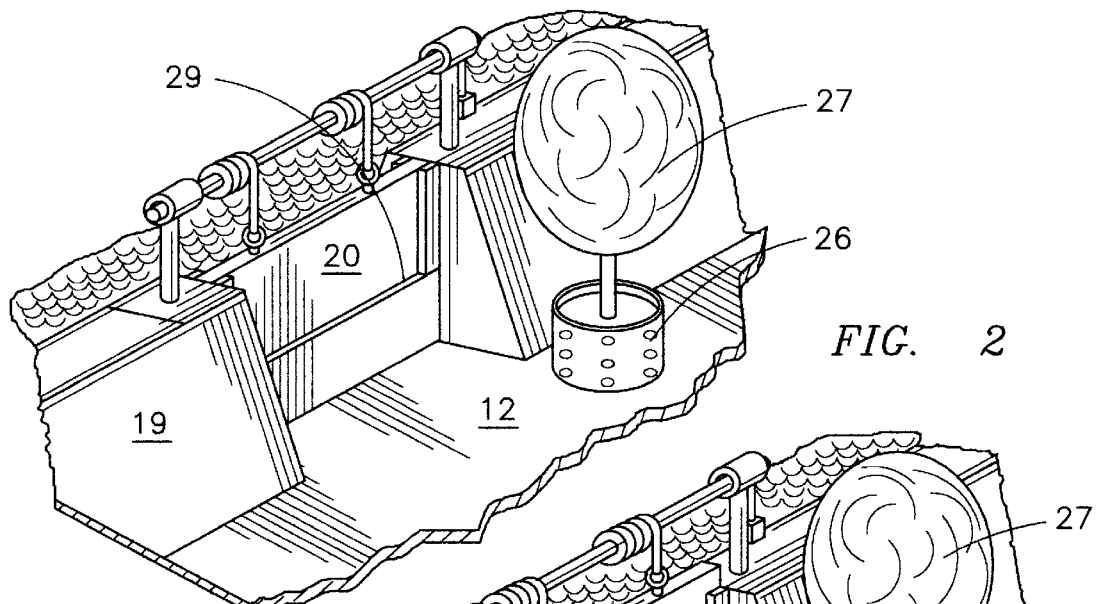
FIG. 2 is an expanded view of an upper flood plain and lower flood plain.
Figure 2A:
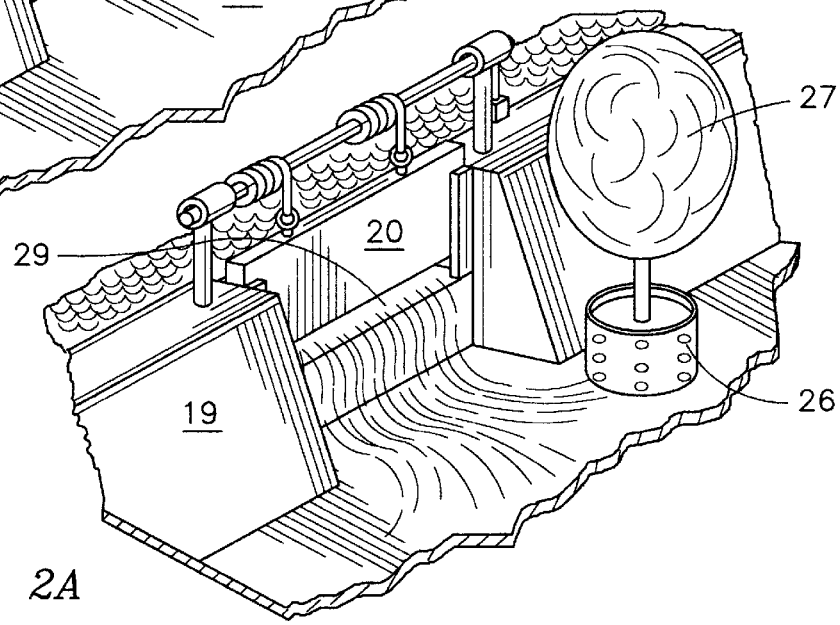
FIG. 2A is a view of the flood gate opened flooding a lower flood plain.
Figure 2B:
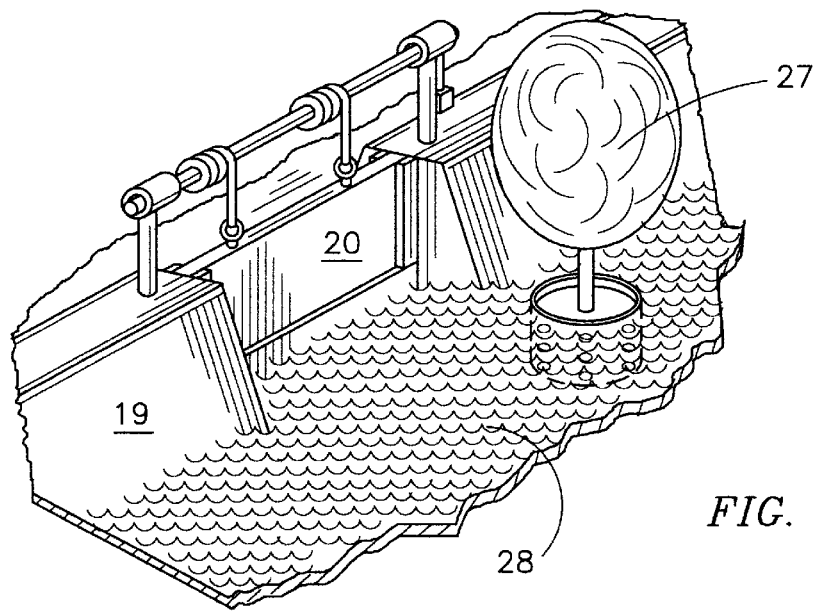
FIG. 2B is a view of the lower flood plain flooded with water from of the upper flood plain.
Figure 3:
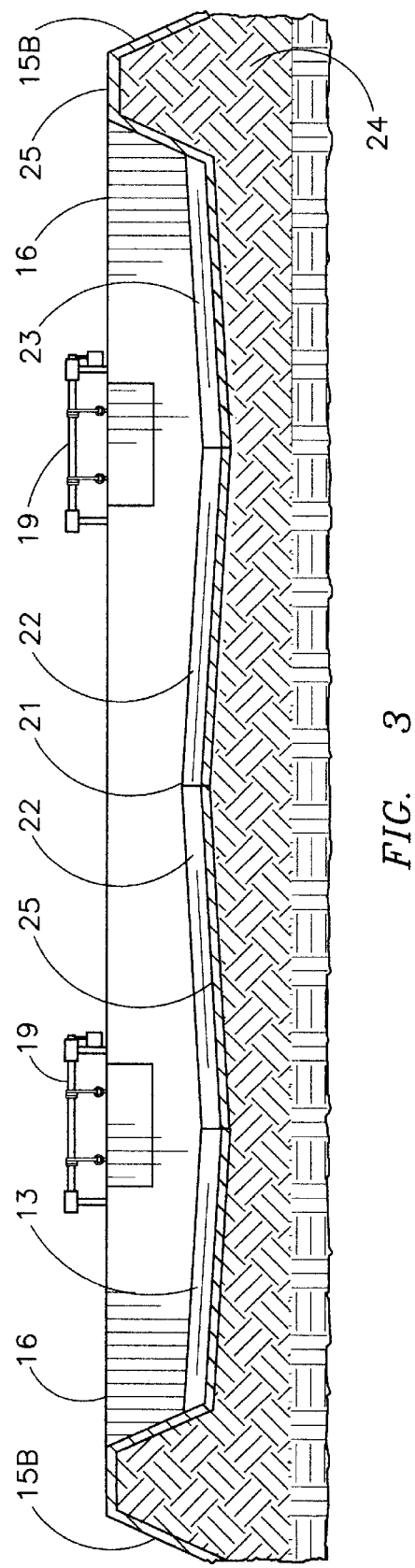
FIG. 3 is a sectional view of the flood irrigation system taken along line 3—3 in FIG. 1.

The operation of the system is shown in FIGS. 2 through 2B and FIGS. 4 through 4B. In FIG. 4, the reservoir 11 as serves a water source for the flood plains 12A and 12B. As shown in FIGS. 2, 2A and 2B, the flood plains 12 have a plurality of pots 26 for holding plants 27. Each of the pots 26 has holes so water may penetrate the pot 26 and irrigate the plants 27. The flood plains 12 are flooded in sequence with a selected volume of water 28 from the reservoir pond 11. The flood gates 20 between the reservoir pond 11 and the flood plain 12A are raised and water 28 drains into the flood plain 12A. The volume of water 28 may depend on the desired water level within each flood plain 12. The pots 26 should be large enough and the water level should not be so high to topple the pots 26. In addition, the flow rate of the water 28 should be slow enough to prevent toppling the pots.

The water 28 is held in the flood plain 12 for a resident time sufficient to irrigate the plants 27 within the pots 26. The amount of time the water 28 will remain in each flood plain 12 is determined in part by the type of plant 27 in the pots 26. One skilled in the art may be able to determine the resident time without undue experimentation.

When the water 28 is drained from an upper flood plain 12A to the lower flood plain 12B, the flood gate 20 remains open as well as flood gates 20 between consecutive dry flood plains 12 so that rain water may drain through the system. Of course, the flood gate 20 for a flood plain 12 retaining water must remain closed, but the level of the water is monitored to drain excess water as necessary. In addition, the water level is monitored to avoid undue loss of water 28 resulting from evaporation or absorption by the plants. The water 28 in a flood plain 12 may be supplanted as necessary to maintain an adequate water level.

After each of the flood plains 12 has been flooded, the water 28 is drained into the retention pond 13. A pump system 14 pulls water from the pond 13 and directs the water 28 back to the reservoir 11 where it is recycled through the irrigation system 10. The retention pond 13 is preferably larger than the reservoir pond 11 and may be able to hold up to five times, or greater, the volume of water as the retention in order to replenish the water supply in the reservoir pond 12 or the flood plains 12.

The retention pond 13 is made larger so that excessive rainwater may be collected in the retention pond 13 and used in the irrigation system 10.

While I have disclosed the preferred embodiment of my invention, it is not intended that this description in any way limits the invention, but rather this invention should be limited only by a reasonable interpretation of the now recited claims.

Having described my invention, what I claim as new and desire to secure by Letters Patent is:

1. A flood irrigation systems comprising:
    (a) a plurality of flood plains;
    (b) a water source in communication with said flood plains, and,
    (c) means, connected to said irrigation system, for sequentially flooding the plurality of flood plains with a selected volume of water from the water source, and each said flood plain being flooded for a resident time; and
    (d) means connected to said flood plains and said water source, for reclamation of water directed through said flood plains to the water source.

2. A flood irrigation system, as defined in claim 1, wherein said sequential flooding means includes at least one spillway, connecting said water source to a first flood plain, and at least one spillway connecting consecutive flood plains of said plurality of flood plains, and at least one spillway connecting a second flood plain to the water reclamation means, and a flood gate adjacent each of said spillways.

3. A flood irrigation system, as defined in claim 2, wherein said plurality of flood plains includes a first flood plain excavated at an uppermost elevation of the plurality of flood plains and a second flood plain excavated at an elevation lower than the first flood plain.

4. A flood irrigation system, as defined in claims 3, wherein said flood irrigation system includes a dike adjacent each flood plain.

5. A flood irrigation system, as defined in claim 2, wherein said flood plains are excavated at consecutive elevations from an uppermost elevation occupied by a first flood plain to a lowest elevation occupied by a second flood plain, and said irrigation system having a dike intermediate each consecutive pair of flood plains, and said sequential flooding means includes at least one spillway extending through said dike, and a flood gate mounted within each said spillway.

6. A flood irrigation system, as defined in claim 5, wherein said water source includes a reservoir pond excavated at an elevation above the elevation of said first flood plain and said irrigation system includes a dike intermediate said reservoir pond and said first flood plain, and said sequential flooding means includes a spillway connecting said water source with the first flood plain, and a flood gate within said spillway.

7. A flood irrigation system, as defined in claim 6, wherein said water reclamation means includes a retention pond excavated at an elevation below said second flood plain, a pump and a conduit connecting said retention pond to the reservoir pond, and said irrigation system includes a dike intermediate the second flood plain and the retention pond, a spillway connecting the second flood plain to the retention pond, and a flood gate adjacent the conduit.

8. A flood irrigation system, as defined in claim 7, further including a water impermeable membrane covering a surface of the flood plains and dikes.

9. A flood irrigation system, as defined in claim 8, further including a perimeter dike surrounding the reservoir pond, the flood plains and the retention pond.

10. A flood irrigation system, comprising:
 (a) a water source;
 (b) a plurality of flood plains excavated at consecutive elevations from an upper most elevation occupied by a first flood plain to a lowest elevation occupied by a second flood plain;
 (c) means, connected to the water source and flood plains, for sequentially flooding the flood plains with a selected volume of water from said water source, and each said flood plain being flooded for a resident time; and,
 (d) means, connected to the second flood plain and the water source, for reclaiming said selected volume of water directed through said flood plains.

11. A flood irrigation system comprising:
 (a) a water source;
 (b) a plurality of flood plains excavated at consecutive elevations from an upper most elevation occupied by a first flood plain to a lowest elevation occupied by a second flood plain;
 (c) means, connected to the water source and flood plains, for sequentially flooding the flood plains with a selected volume of water from said water source, and each said flood plain being flooded for a resident time, wherein said sequential flooding means includes at least one spillway connecting said water source to the first flood plain, and at least one spillway connecting consecutive flood plains, and at least one spillway connecting the second flood plain to the water reclamation means, and a flood gate within each said spillway; and,
 (d) means, connected to the second flood plain and the water source, for reclaiming said selected volume of water directed through said flood plains.

12. A flood irrigation system, as defined in claim 11, wherein said water source includes a reservoir pond adjacent said first flood plain at an elevation above said first flood plain and said water reclamation means includes a retention pond adjacent the second flood plain at an elevation below said second flood plain.

13. A flood irrigation system, as defined in claim 12, further including a perimeter dike surrounding the reservoir pond, the flood plains and the retention pond, and a plurality of interior dikes within the perimeter dike, said interior dikes extending intermediate consecutive flood plains, extending between the first flood plain and the reservoir pond and extending between the second flood plain and the retention pond.

14. A flood irrigation system, as defined in claim 13, further including an impermeable membrane covering a surface of the dikes and a surface of each flood plain.

15. A method for flood irrigation comprising the steps of:
 (a) providing a plurality of flood plains, each said flood plain having a plurality of plants therein;
 (b) providing a water source for flooding said flood plains; and,
 (c) sequentially flooding said flood plains with a selected volume of water from said water source wherein each said flood plain is flooded with said selected volume of water for a resident time;
 (d) reclaiming said selected volume water from the flood plains to said water source after said flood plains have been sequentially flooded for a resident time.

16. A method for flood irrigation, as defined in claim 15, further including the step of placing a water impermeable membrane over a surface of each of the flood plains and a dike prior to said sequentially flooding said flood plains for a resident time.

17. A flood irrigation method, as defined in claim 15, wherein said flood plains are excavated at consecutive elevations and said flood plains include a first flood plain excavated at an uppermost elevation and a second flood plain excavated at an elevation lower than said first flood plain.

18. A flood irrigation method, as defined in claim 17, wherein said step of sequential flooding includes a spillway connecting consecutive flood plains for water to drain from a flood plain at a mounting a flood gate within spillway.

19. A flood irrigation method, as defined in claim 18, wherein in said water source includes a reservoir pond having water, said reservoir pond excavated at an elevation above the first flood plain and a spillway connecting said reservoir pond to the first flood plain and a flood gate is mounted within the spillway.

20. A flood irrigation method, as defined in claim 19, wherein said water reclaiming step includes excavating a retention pond at an elevation lower than the elevation of the second flood plain and forming a spillway connecting the second flood plain to the retention pond and placing a flood gate within the spillway.

21. A flood irrigation method, as defined in claim 20, further including the step of forming a dike intermediate consecutive flood plains and forming a spillway through each said dike, connecting consecutive flood plains and placing a flood gate within each said spillway.

22. A flood irrigation method, as defined in claim 21, further including the step of forming a perimeter dike extending around the reservoir pond, the plurality of flood plains and the retention pond.

23. A method of flood irrigation, as defined in claim 22, further including the step of placing a water impermeable membrane over a surface of each of the flood plains and the dikes before the flood plains are sequentially flooded for a resident time.

* * * * *